(12) United States Patent
Tang et al.

(10) Patent No.: US 11,490,433 B2
(45) Date of Patent: Nov. 1, 2022

(54) METHOD AND SYSTEM FOR CONFLICT RESOLUTION USING A TERMINAL DEVICE

(71) Applicant: Guangdong OPPO Mobile Telecommunications Corp., Ltd., Guangdong (CN)

(72) Inventors: Hai Tang, Dongguan (CN); Huei-Ming Lin, Melbourne (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 24 days.

(21) Appl. No.: 16/775,029

(22) Filed: Jan. 28, 2020

(65) Prior Publication Data

US 2020/0196365 A1 Jun. 18, 2020

Related U.S. Application Data

(63) Continuation of application No. PCT/CN2018/081783, filed on Apr. 3, 2018.

(30) Foreign Application Priority Data

Dec. 28, 2017 (WO) ............... PCT/CN2017/119594
Feb. 7, 2018 (WO) ............... PCT/CN2018/075693

(51) Int. Cl.
*H04W 76/14* (2018.01)
*H04W 28/02* (2009.01)
(Continued)

(52) U.S. Cl.
CPC ....... *H04W 76/14* (2018.02); *H04W 28/0278* (2013.01); *H04W 72/042* (2013.01); *H04W 72/10* (2013.01); *H04W 72/1284* (2013.01)

(58) Field of Classification Search
None
See application file for complete search history.

(56) References Cited

U.S. PATENT DOCUMENTS

2019/0053251 A1* 2/2019 Loehr ............... H04W 72/1263

FOREIGN PATENT DOCUMENTS

CN 106717101 A 5/2017
CN 106900005 A 6/2017
(Continued)

OTHER PUBLICATIONS

LG Electronics,Discussion on power control for simultaneous SL TX and WAN TX in different carriers,Reno, USA Nov. 14-18, 2016, 3GPP TSG RAN WG1 Meeting #87, R1-1611743 (Year: 2016).*
(Continued)

*Primary Examiner* — Kouroush Mohebbi
(74) *Attorney, Agent, or Firm* — Bayes PLLC

(57) ABSTRACT

Embodiments of this application provide a conflict resolving method and a terminal device. When uplink transmission conflicts with sidelink transmission in time, the terminal device can resolve the data transmission conflict based on a ProSe per-packet priority (PPPP) of data on a sidelink and a limit, thereby satisfying data transmission requirements in Release 15 and subsequent Releases. The method is applied to terminal-to-terminal communication. A terminal device needs to transmit sidelink data on M first-type carriers and transmit uplink data on N second-type carriers, and M and N are positive integers. The method includes: determining, by the terminal device based on a PPPP of the sidelink data transmitted on the M first-type carriers and a first limit, to preferentially transmit the sidelink data on some or all of the M first-type carriers, or to preferentially transmit the uplink data on some or all of the N second-type carriers.

14 Claims, 5 Drawing Sheets

(51) Int. Cl.
*H04W 72/04* (2009.01)
*H04W 72/10* (2009.01)
*H04W 72/12* (2009.01)

(56) References Cited

FOREIGN PATENT DOCUMENTS

| | | |
|---|---|---|
| CN | 107079530 A | 8/2017 |
| CN | 107211377 A | 9/2017 |
| CN | 107852773 A | 3/2018 |
| WO | WO2017026844 A1 | 2/2017 |
| WO | WO2017036342 A1 | 3/2017 |
| WO | WO2017111316 A1 | 6/2017 |
| WO | 2017/137231 A1 | 8/2017 |
| WO | 2017/138798 A1 | 8/2017 |
| WO | WO2016147235 A1 | 12/2017 |
| WO | 2019022470 A1 | 1/2019 |

OTHER PUBLICATIONS

Huawei, HiSilicon,Discussion on Prioritization between UL TX and V2X SL TX,Reno, USA, Nov. 14-18, 2016,3GPP TSG RAN WG2 Meeting #96, R2-167929 (Year: 2016).*

Samsung, Power allocation for simultaneous UL and SL TX in different carriers, Reno, USA Nov. 14-18, 2016, 3GPP TSG RAN WG1 Meeting #87, R1-1612393 (Year: 2016).*

International Search Report, PCT/CN2018/081783, dated Aug. 8, 2018.

International Search Report, PCT/CN2018/075693, dated Aug. 31, 2018.

International Search Report, PCT/CN2017/119594, dated Sep. 25, 2018.

Huawei. "Summary of [96#59][LTE/V2X] on Uu/SL Prioritization" 3GPP TSG-RAN WG2 Meeting #97 R2-1701375, Feb. 17, 2017 (Feb. 17, 2017), text, section 2, table 2, 14 pages.

Intel Corporation. Discussion on Conflict/Collision-Free Sidelink UE-to-NW Relaying for Wearable and IoT Use Cases. 3GPP TSG RAN WG1 Meeting#90, R1-1712517. Aug. 25, 2017 (Aug. 25, 2017), entire document, 5 pages.

Huawei et al. Correction to UL and V2X SL Prioritization. 3GPP TSG-RAN WG2 Meeting #98, R2-1704039. May 19, 2017 (May 19, 2017), entire document, 3 pages.

Ad-Hoc Chairlge. Chairman's Notes of AI 6.2.1 on LTE-based V2X Services. 3GPP TSG RAN WG1 Meeting #87 R1-1613698. Nov. 18, 2016 (Nov. 18, 2016), section 6.2.1.5, paragraph 1 to the last paragraph, 8 pages.

Samsung. Power Allocation for Simultaneous UL and SL TX in Different Carriers. 3GPP TSG RAN WG1 Meeting #87 R1-1612393. Nov. 18, 2016 (Nov. 18, 2016), chapter 1,paragraph 1 to chapter 2, the last paragraph, 3 pages.

RAN WG1. LS on RAN1 Agreements Potentially Related to RAN2/4 in LTE-based V2X Services. 3GPP TSG RAN WG1 Meeting #87 R1-1613807. Nov. 18, 2016 (Nov. 18, 2016), chapter 1, paragraph 3 to the last paragraph, 4 pages.

LG Electronics. Discussion on Power Control for Simultaneous SL TX and WAN TX in Different Carriers. 3GPP TSG RAN WG1 Meeting #87 R1-1611743. Nov. 18, 2016 (Nov. 18, 2016), chapter 1, paragraph 2 to chapter 2, the last paragraph, 2 pages.

Huawei et al. Discussion on Prioritization between UL TX and V2X SL TX. 3GPP TSG RAN WG2 Meeting #96 R2-167929. Nov. 18, 2016 (Nov. 18, 2016), chapter 1, paragraph 1 to chapter 2, the last paragraph, 3 pages.

RP-170798 3GPP TSG RAN Meeting #75 Dubrovnik, Croatia, Mar. 6-9, 2017.

"Clarify relation of PPPP, PDB & priority", Source to WG: Ericcson, LG Electronic, Nokia, Source to TSG: SA WG2, SA WG2 Meeting #S2-118BIS, S2-170371, Jan. 16-20, 2017, Spokane, Washington, USA, 3 pages.

"Pseudo-CR on mapping between PPPP to PDB for V2X communication over PC5 in the V2X services MO", Source: LG Electronics, Huawei, HiSilicon, Spec: 3GPP TS 24.385 v0.1.0, Agenda item: 14.2.5, 3GPP TSG-CT WG1 Meeting #101, C1-165329, Reno, NV (USA), Nov. 14-18, 2016, 4 pages.

"3rd Generation Partnership Project; Technical Specification Group Services and System Aspects; Proximity-based services (ProSe); Stage 2 (Release 15)", 3GPP TS 23.303 V15.0.0 (Jun. 2017), 131 pages.

Supplemental European Search Report issued in corresponding European Patent Application No. EP 18 89 5692, dated Nov. 19, 2020, 14 pages.

First Office action issued in corresponding Chinese Application No. 202010071267.5, dated Apr. 25, 2021, 22 pages.

Second Office action issued in corresponding Chinese Application No. 202010071267.5, dated Jul. 16, 2021, 24 pages.

Notice of Reasons for Refusal issued in corresponding Japanese Application No. 2020-536131, dated Feb. 18, 2022, 8 pages.

First Office action issued in corresponding India Application No. 202027031873, dated Dec. 1, 2021, 7 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.4.0 (Sep. 2017), 329 pages.

"Discussion on carrier selection in PC5 CA", Agenda item: 9.10.2, Source: ZTE, 3GPP TSG-RAN WG2 Meeting #100 R2-1713070, Reno, USA, Nov. 27-Dec. 1, 2017, 6 pages.

"Mode-3 support in V2X CA", Agenda item: 5.2.3.1.1, Source: Samsung, 3GPP TSG RAN WG1 #90 R1-1713525, Prague, Czechia, Aug. 21-25, 2017, 3 pages.

Communication pursuant to Article 94(3) EPC issued in corresponding European Application No. 18895692.4, dated Aug. 9, 2021, 5 pages.

Written Opinion and Search Report issued in corresponding Singapore Application No. 11202006264S, dated May 9, 2022, 8 pages.

\* cited by examiner

METHOD AND SYSTEM FOR CONFLICT RESOLUTION USING A TERMINAL DEVICE

CROSS-REFERENCES TO RELATED APPLICATIONS

This application is a continuation of and claims priority to International Patent Application No. PCT/CN2018/081783, filed Apr. 3, 2018, which claims priority to International Patent Application No. PCT/CN2017/119594, filed Dec. 28, 2017 and PCT/CN2018/075693, filed Feb. 7, 2018, the disclosures of which are hereby incorporated by reference in their entireties.

BACKGROUND OF THE INVENTION

Technical Field

This application relates to the communications field, and more specifically, to a conflict resolving method and a terminal device.

Related Art

In Release 14, a terminal device (for example, a vehicle terminal) can transmit data to a network device on an uplink and transmit data to another terminal on a sidelink. When uplink transmission overlaps sidelink transmission in time, power is allocated based on measuring a priority of a link service. For example, a network may be configured with a threshold of a ProSe per-packet priority (PPPP) (or a preconfigured threshold). When a PPPP of sidelink data is greater than the threshold, the terminal device ensures transmission of the sidelink data, and discards uplink transmission or reduces power of uplink data. When the PPPP of the sidelink data is less than or equal to the threshold, the terminal device ensures transmission of the uplink data, and discards the transmission of the sidelink data or reduces power of the sidelink data. However, such a manner of resolving the overlapping (conflict) of the uplink transmission and the sidelink transmission in time cannot satisfy data transmission requirements in Release 15 and subsequent Releases.

SUMMARY OF THE INVENTION

Embodiments of this application provide a conflict resolving method and a terminal device. When uplink transmission conflicts with sidelink transmission in time, the terminal device can resolve the data transmission conflict based on a PPPP of data on a sidelink and a limit, thereby satisfying data transmission requirements in Release 15 and subsequent Releases.

According to a first aspect, an embodiment of this application provides a conflict resolving method, the method being applied to terminal-to-terminal communication. A terminal device needs to transmit sidelink data on M first-type carriers and transmit uplink data on N second-type carriers, and M and N are positive integers.

The method includes determining, by the terminal device based on a PPPP of the sidelink data transmitted on the M first-type carriers and a first limit, to preferentially transmit the sidelink data on some or all of the M first-type carriers, or to preferentially transmit the uplink data on some or all of the N second-type carriers.

Optionally, the first limit may be preset for the terminal device, for example, preset for the terminal device by using a protocol, or may be dynamically configured for the terminal device by a network device, or may be determined by the terminal device.

Therefore, in the conflict resolving method in this embodiment of this application, when the terminal device needs to transmit the sidelink data on the M first-type carriers and transmit the uplink data on the N second-type carriers, the terminal device may determine, based on the PPPP of the sidelink data transmitted on the M first-type carriers and the first limit, to preferentially transmit the sidelink data on some or all of M first-type carriers, or to preferentially transmit the uplink data on some or all of the N second-type carriers, thereby resolving a conflict in time dimension between uplink transmission and sidelink transmission of the terminal device.

Optionally, in an implementation of the first aspect, if at least one PPPP of the sidelink data on the M first-type carriers is less than the first limit, the determining, by the terminal device based on a PPPP of the sidelink data transmitted on the M first-type carriers and a first limit, to preferentially transmit the sidelink data on some or all of the M first-type carriers, or to preferentially transmit the uplink data on some or all of the N second-type carriers includes: determining, by the terminal device, to preferentially transmit the sidelink data on the M first-type carriers.

Therefore, in the conflict resolving method in this embodiment of this application, when at least one PPPP of the sidelink data on the M first-type carriers is less than the first limit, the terminal device can determine to preferentially transmit the sidelink data on some or all of the M first-type carriers.

Optionally, in an implementation of the first aspect, the method further includes: discarding, by the terminal device, transmission of the uplink data on the second-type carrier.

Optionally, in an implementation of the first aspect, after the sidelink data on the M first-type carriers is transmitted, the method further includes: transmitting, by the terminal device, uplink data on X second-type carriers, where total transmit power used to transmit the sidelink data on the M first-type carriers and transmit the uplink data on the X second-type carriers is less than or equal to a maximum transmit power of the terminal device, and X is less than or equal to N.

Optionally, in an implementation of the first aspect, the determining, by the terminal device, to preferentially transmit the sidelink data on the M first-type carriers includes: determining, by the terminal device, to preferentially transmit sidelink data whose reliability requirement is greater than or equal to a first threshold on the M first-type carriers.

It should be noted that, the sidelink data whose reliability requirement is greater than or equal to the first threshold may be understood as sidelink data whose reliability requirement is greater than the first threshold, or may be understood as sidelink data whose reliability requirement is greater than or equal to the first threshold.

Optionally, the first threshold may be preset for the terminal device, for example, preset for the terminal device by using a protocol, or may be dynamically configured for the terminal device by a network device, or may be determined by the terminal device.

It should be noted that, the reliability requirement of the sidelink data may be represented by a ProSe per-packet reliability (PPPR) requirement.

Therefore, transmission of the sidelink data with a high reliability requirement can be ensured.

Optionally, in an implementation of the first aspect, the method further includes: determining, by the terminal device, to discard transmission of sidelink data whose reliability requirement is less than or equal to the first threshold on the M first-type carriers.

Optionally, in an implementation of the first aspect, the method further includes: determining, by the terminal device, to transmit the sidelink data whose reliability requirement is less than or equal to the first threshold on the M first-type carriers after transmitting the sidelink data whose reliability requirement is greater than or equal to the first threshold.

Optionally, in an implementation of the first aspect, if the sidelink data includes first sidelink data and second sidelink data based on packet data convergence protocol (PDCP) replication transmission, and the second sidelink data is replicated data of the first sidelink data, the determining, by the terminal device, to preferentially transmit the sidelink data on the M first-type carriers includes: determining, by the terminal device, to preferentially transmit the first sidelink data on the M first-type carriers.

Optionally, in an implementation of the first aspect, the method further includes: determining, by the terminal device, to discard transmission of the second sidelink data on the M first-type carriers.

It should be noted that, the first sidelink data and the second sidelink data are PDCP protocol data units (PDU). The terminal device generates a corresponding radio link control (RLC) PDU and further a media access control (MAC) PDU based on the PDCP PDU. Moreover, the first sidelink data and the second sidelink data on two logical channels of PDCP replication transmission are determined by the terminal device, or configured by a network device.

Therefore, transmission of one piece of sidelink data may be preferentially ensured during PDCP replication transmission of the sidelink data, so that power consumption can be reduced while replication data transmission is ensured.

Optionally, in an implementation of the first aspect, if at least one PPPP of the sidelink data on the M first-type carriers is greater than or equal to the first limit, the determining, by the terminal device based on a PPPP of the sidelink data transmitted on the M first-type carriers and a first limit, to preferentially transmit the sidelink data on some or all of the M first-type carriers, or to preferentially transmit the uplink data on some or all of the N second-type carriers includes: determining, by the terminal device, to preferentially transmit the uplink data on the N second-type carriers.

Therefore, in the conflict resolving method in this embodiment of this application, when at least one PPPP of the sidelink data on the M first-type carriers is greater than or equal to the first limit, the terminal device can determine to preferentially transmit the uplink data on some or all of the N second-type carriers.

Optionally, in an implementation of the first aspect, if at least one PPPP of the sidelink data on the M first-type carriers is greater than the first limit, the determining, by the terminal device based on a PPPP of the sidelink data transmitted on the M first-type carriers and a first limit, to preferentially transmit the sidelink data on some or all of the M first-type carriers, or to preferentially transmit the uplink data on some or all of the N second-type carriers includes: determining, by the terminal device, to preferentially transmit the uplink data on the N second-type carriers.

Therefore, in the conflict resolving method in this embodiment of this application, when at least one PPPP of the sidelink data on the M first-type carriers is greater than the first limit, the terminal device can determine to preferentially to transmit the uplink data on some or all of the N second-type carriers.

Optionally, in an implementation of the first aspect, if none of PPPPs of the sidelink data on the M first-type carriers is less than the first limit, the determining, by the terminal device based on a PPPP of the sidelink data transmitted on the M first-type carriers and a first limit, to preferentially transmit the sidelink data on some or all of the M first-type carriers, or to preferentially transmit the uplink data on some or all of the N second-type carriers includes: determining, by the terminal device, to preferentially transmit the uplink data on the N second-type carriers.

Therefore, in the conflict resolving method in this embodiment of this application, if none of PPPPs of the sidelink data on the M first-type carriers is less than the first limit, the terminal device can determine to preferentially transmit the uplink data on some or all of the N second-type carriers.

Optionally, in an implementation of the first aspect, the method further includes: discarding, by the terminal device, transmission of the sidelink data on the first-type carrier.

Optionally, in an implementation of the first aspect, after the uplink data on the N second-type carriers is transmitted, the method further includes: transmitting, by the terminal device, sidelink data on Y first-type carriers, where total transmit power required to transmit the uplink data on the N second-type carriers and transmit the sidelink data on the Y first-type carriers is less than or equal to a maximum transmit power of the terminal device, and Y is less than or equal to M.

Optionally, in an implementation of the first aspect, if a PPPP of sidelink data on U first-type carriers is less than the first limit, and a sum of U and V is M, the determining, by the terminal device based on a PPPP of the sidelink data transmitted on the M first-type carriers and a first limit, to preferentially transmit the sidelink data on some or all of the M first-type carriers, or to preferentially transmit the uplink data on some or all of the N second-type carriers includes: determining, by the terminal device, to preferentially transmit the sidelink data on the U first-type carriers.

Therefore, in the conflict resolving method in this embodiment of this application, when the PPPP of the sidelink data on the U first-type carriers in the M first-type carriers is less than the first limit, the terminal device can determine to preferentially transmit the sidelink data on some or all of the U first-type carriers.

Optionally, in an implementation of the first aspect, the method further includes: discarding, by the terminal device, transmission of the uplink data on the N second-type carriers and transmission of sidelink data on V first-type carriers.

Optionally, in an implementation of the first aspect, after the sidelink data on the U first-type carriers is transmitted, the method further includes: transmitting, by the terminal device, uplink data on K second-type carriers, where total transmit power used to transmit the sidelink data on the U first-type carriers and transmit the uplink data on the K second-type carriers is less than or equal to a maximum transmit power of the terminal device, and K is less than or equal to N.

Optionally, in an implementation of the first aspect, after the sidelink data on the U first-type carriers is transmitted, the method further includes: transmitting, by the terminal device, uplink data on Q second-type carriers, and transmitting sidelink data on S first-type carriers, where total transmit power used to transmit the sidelink data on the U first-type carriers, transmit the uplink data on the Q second-type carriers and transmit the sidelink data on the S first-type carriers is less than or equal to the maximum transmit power of the terminal device, Q is less than or equal to N, and S is less than or equal to V.

Optionally, in an implementation of the first aspect, the determining, by the terminal device, to preferentially transmit the sidelink data on the U first-type carriers includes: determining, by the terminal device, to preferentially transmit sidelink data whose reliability requirement is greater than or equal to a first threshold on the U first-type carriers.

Optionally, in an implementation of the first aspect, the method further includes: determining, by the terminal device, to discard transmission of sidelink data whose reliability requirement is less than or equal to the first threshold on the U first-type carriers.

Optionally, in an implementation of the first aspect, if the sidelink data includes first sidelink data and second sidelink data based on PDCP replication transmission, and the second sidelink data is replicated data of the first sidelink data, the determining, by the terminal device, to preferentially transmit the sidelink data on the U first-type carriers includes: determining, by the terminal device, to preferentially transmit the first sidelink data on the U first-type carriers.

Optionally, in an implementation of the first aspect, the method further includes: determining, by the terminal device, to discard transmission of the second sidelink data on the U first-type carriers.

According to a second aspect, an embodiment of this application provides a terminal device, which can execute the module or unit of the method according to any one of the first aspect or the optional implementations of the first aspect.

According to a third aspect, a terminal device is provided, and the terminal device includes a processor, a memory, and a communications interface. The processor and the memory are connected to the communications interface. The memory is configured to store an instruction, the processor is configured to execute the instruction, and the communications interface is configured to communicate with another network element under control of the processor. When the processor executes the instruction stored in the memory, the processor is caused to perform the method according to any one of the first aspect or the possible implementations of the first aspect.

According to a fourth aspect, a computer storage medium is provided, and the computer storage medium stores program code, which is used to instruct a computer to execute the instruction of the method according to the foregoing aspects.

According to a fifth aspect, a computer program product including an instruction is provided, and when the computer program product is run on a computer, the computer is caused to perform the method according to the foregoing aspects.

DETAILED DESCRIPTION OF THE INVENTION

The following describes technical solutions of embodiments of this application clearly and completely with reference to the accompanying drawings of the embodiments of this application.

It should be understood that, the technical solutions of the embodiments of this application can be applied to a device-to-device (Device to Device, D2D) communications system, for example, an Internet-of-Vehicles system that performs D2D communication based on long term evolution (LTE). Different from a manner of receiving or sending communication data between terminals in a conventional LTE system by using a network device (for example, a base station), the Internet-of-Vehicles system uses a direct terminal-to-terminal communication manner, and therefore, has higher spectral efficiency and a lower transmission delay.

Optionally, the communications system on which the Internet-of-Vehicles system is based may be a global system for mobile communications (GSM), a code division multiple access (CDMA) system, a wideband code division multiple access (WCDMA) system, a general packet radio service (GPRS) system, an LTE system, an LTE frequency division duplex (FDD) system, an LTE time division duplex (TDD) system, a universal mobile telecommunications system (UMTS) system, a worldwide interoperability for microwave access (WiMAX) communications system, a 5G new radio (NR) system, or the like.

The terminal device in the embodiments of this application may be a terminal device that can implement D2D communication. For example, the terminal device may be a vehicle terminal device, or may be a terminal device in a 5G network or a terminal device in a future evolved public land mobile network (PLMN), or the like. This is not limited in this embodiment of this application.

Figure 1:
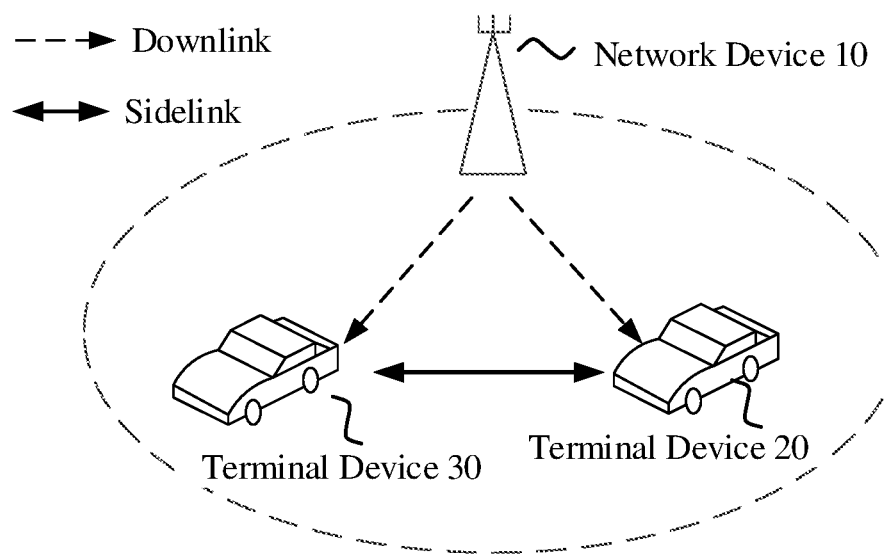
FIG. 1 is a schematic diagram of an application scenario according to an embodiment of this application.
Figure 2:
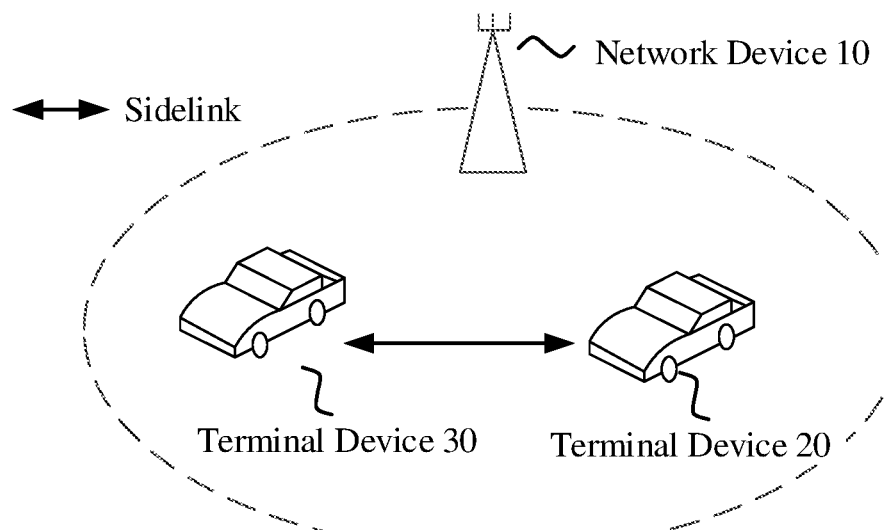
FIG. 2 is a schematic diagram of another application scenario according to an embodiment of this application.

FIG. 1 and FIG. 2 are each a schematic diagram of an application scenario according to an embodiment of this application. FIG. 1 shows one network device and two terminal devices as an example. Optionally, a wireless communications system in this embodiment of this application may include a plurality of network devices and another quantity of terminal devices may be included within coverage of each network device. This is not limited in this embodiment of this application.

Optionally, the wireless communications system may further include other network entities such as a mobility management entity (MME), a serving gateway (S-GW), and a packet data network gateway (P-GW), or the wireless communications system may further include other network entities such as a session management function (SMF), a unified data management (UDM), and an authentication server function (AUSF). This is not limited in this embodiment of this application.

Specifically, a terminal device 20 may communicate with a terminal device 30 in a D2D communication mode. During D2D communication, the terminal device 20 directly communicates with the terminal device 30 through a D2D link, that is, a sidelink (SL). For example, as shown in FIG. 1 or FIG. 2, the terminal device 20 directly communicates with the terminal device 30 through the sidelink. In FIG. 1, the terminal device 20 communicates with the terminal device 30 through the sidelink, and transmission resources thereof are allocated by the network device. In FIG. 2, the terminal device 20 communicates with the terminal device 30 through the sidelink, and transmission resources thereof are autonomously selected by the terminal devices, and do not need to be allocated by the network device.

D2D communication may refer to vehicle-to-vehicle (V2V) communication or vehicle-to-everything (V2X) communication. In V2X communication, X may generally refer to any device with wireless receiving and sending capabilities, for example, but not limited to, a slow-moving wireless apparatus or a fast-moving vehicle-mounted device, or a network control node with the wireless transmitting and receiving capabilities. It should be understood that the embodiments of the present invention are mainly applied to a V2X communication scenario, but can also be applied to any other D2D communication scenario. This is not limited in this embodiment of this application.

In the Internet-of-Vehicles system, there are two types of terminal devices, that is, a terminal device with a listening capability, for example, vehicle user equipment (VUE) or pedestrian user equipment (PUE), and a terminal device without the listening capability, for example, a PUE. The VUE has a better processing capability and is usually powered by a battery in a vehicle. The PUE has a poor processing capability, and reducing power consumption is a main factor that needs to be considered for the PUE. Therefore, in the existing Internet-of-Vehicles system, the VUE is considered as having full reception and listening capabilities; while the PUE is considered as having partial or no reception and listening capability. If the PUE has a partial listening capability, available resources may be selected from resources that can be listened to for the PUE by using a listening method similar to that of the VUE. If the PUE has no listening capability, the PUE randomly selects transmission resources from a resource pool.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD), a digital versatile disc (DVD), a smart card and a flash memory component (for example, an erasable programmable read-only memory (EPROM), a card, a stick, or a key drive). In addition, various storage media described in this specification may represent one or more devices and/or other machine-readable media configured to store information. The term "machine-readable media" may include but is not limited to various media that can store, contain and/or carry an instruction and/or data.

It should be understood that, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

Figure 3:
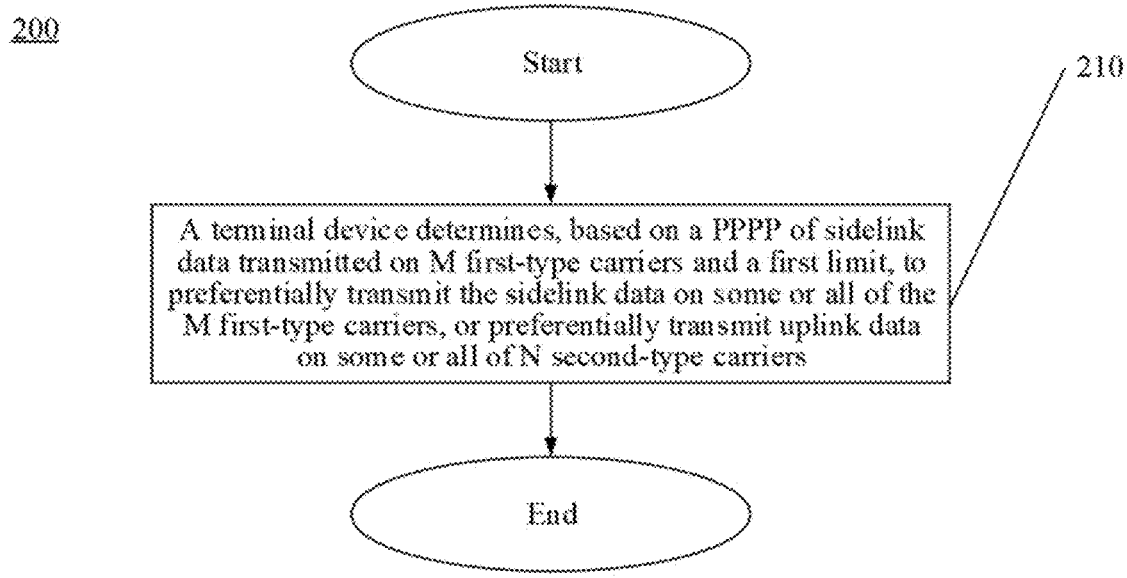
FIG. 3 is a schematic flowchart of a conflict resolving method according to an embodiment of this application.

FIG. 3 is a schematic flowchart of a conflict resolving method 200 according to an embodiment of this application.

As shown in FIG. 3, the method 200 is applied to terminal-to-terminal communication. The method 200 may be performed by a terminal device, and the terminal device may be a terminal device shown in FIG. 1 or FIG. 2. It should be understood that the terminal device needs to transmit sidelink data on M first-type carriers and transmit uplink data on N second-type carriers, and M and N are positive integers. The method 200 includes the following content.

210. The terminal device determines, based on a PPPP of the sidelink data transmitted on the M first-type carriers and a first limit, to preferentially transmit the sidelink data on some or all of the M first-type carriers, or to preferentially transmit the uplink data on some or all of the N second-type carriers.

Optionally, the first limit may be configured by a network device, or may be preconfigured for the terminal device.

It should be understood that the first limit may be configured based on actual needs.

Optionally, the first-type carrier may be a PC5 carrier, and the second-type carrier may be a Uu carrier.

It should be understood that transmit power used by the terminal device to transmit data on the PC5 carrier and/or the Uu carrier needs to be less than or equal to a maximum transmit power of the terminal device.

Specifically, if at least one PPPP of the sidelink data on the M first-type carriers is less than the first limit, the terminal device determines to preferentially transmit the sidelink data on the M first-type carriers.

For example, at a moment H, the terminal device needs to transmit the sidelink data on the M first-type carriers and transmit the uplink data on the N second-type carriers. If at least one PPPP of the sidelink data on the M first-type carriers is less than the first limit, the terminal device determines to preferentially transmit the sidelink data on the M first-type carriers.

It should be understood that a smaller PPPP value of data indicates a higher priority thereof.

For example, if a PPPP value of data a is 1, and a PPPP value of data b is 5, a priority of the data a is higher than that of the data b.

Optionally, when the terminal device determines to preferentially transmit the sidelink data on the M first-type carriers, the terminal device may discard transmission of the uplink data on the second-type carrier.

For example, when the total transmit power required to transmit the sidelink data on the M first-type carriers is equal to the maximum transmit power of the terminal device, the terminal device may discard transmission of the uplink data on the second-type carrier when transmitting the sidelink data on the M first-type carriers.

Optionally, after the sidelink data on the M first-type carriers is transmitted, the terminal device transmits uplink data on X second-type carriers, where total transmit power used to transmit the sidelink data on the M first-type carriers and transmit the uplink data on the X second-type carriers is less than or equal to the maximum transmit power of the terminal device, and X is less than or equal to N.

It should be understood that, the same as N, X is also a positive integer.

Optionally, in this embodiment of this application, when the terminal device determines to preferentially transmit the sidelink data on the M first-type carriers, the terminal device may determine to preferentially transmit sidelink data whose reliability requirement is greater than or equal to a first threshold on the M first-type carriers.

It should be noted that, the sidelink data whose reliability requirement is greater than or equal to the first threshold may be understood as sidelink data whose reliability requirement is greater than the first threshold, or may be understood as sidelink data whose reliability requirement is greater than or equal to the first threshold.

Optionally, the first threshold may be preset for the terminal device, for example, preset for the terminal device by using a protocol, or may be dynamically configured for the terminal device by the network device, or may be determined by the terminal device.

It should be understood that the first threshold may be configured based on actual needs.

It should be noted that, the reliability requirement of the sidelink data may be represented by PPPR.

Therefore, transmission of the sidelink data with a high reliability requirement can be ensured.

Optionally, in an example, when the terminal device determines to preferentially transmit the sidelink data on the M first-type carriers, the terminal device may determine to preferentially transmit the sidelink data whose reliability requirement is greater than or equal to the first threshold on the M first-type carriers and determine to discard transmission of the sidelink data whose reliability requirement is less than or equal to the first threshold on the M first-type carriers.

Optionally, in an example, when the terminal device determines to preferentially transmit the sidelink data on the M first-type carriers, after transmitting the sidelink data whose reliability requirement is greater than or equal to the first threshold on the M first-type carriers, the terminal device determines to transmit the sidelink data whose reliability requirement is less than or equal to the first threshold on the M first-type carriers.

Optionally, if the sidelink data includes first sidelink data and second sidelink data based on PDCP replication transmission, and the second sidelink data is replicated data of the first sidelink data, the terminal device may determine to preferentially transmit the first sidelink data on the M first-type carriers. Therefore, transmission of one piece of sidelink data may be preferentially ensured during PDCP replication transmission of the sidelink data, so that power consumption can be reduced while replication data transmission is ensured.

Optionally, when the terminal device can determine to preferentially transmit the first sidelink data on the M first-type carriers, the method further includes determining, by the terminal device, to discard transmission of the second sidelink data on the M first-type carriers.

It should be noted that the first sidelink data and the second sidelink data are PDCP PDUs. The terminal device generates a corresponding RLC PDU and further a MAC PDU based on the PDCP PDU. Moreover, the first sidelink data and the second sidelink data on two logical channels of the PDCP replication transmission are determined by the terminal device, or configured by the network device.

Specifically, if at least one PPPP of the sidelink data on the M first-type carriers is greater than or equal to the first limit, the terminal device determines to preferentially transmit the uplink data on the N second-type carriers.

Specifically, if at least one PPPP of the sidelink data on the M first-type carriers is greater than the first limit, the terminal device determines to preferentially transmit the uplink data on the N second-type carriers.

Specifically, if none of PPPPs of the sidelink data on the M first-type carriers is less than the first limit, the terminal device determines to preferentially transmit the uplink data on the N second-type carriers.

Optionally, when the terminal device determines to preferentially transmit the uplink data on the N second-type carriers, the terminal device may discard transmission of the sidelink data on the first-type carrier.

For example, when total transmit power required to transmit the uplink data on the N second-type carriers is equal to the maximum transmit power of the terminal device, the terminal device may discard transmission of the sidelink data on the first-type carrier when transmitting the uplink data on the N second-type carriers.

Optionally, after the uplink data on the N second-type carriers is transmitted, the terminal device transmits sidelink data on Y first-type carriers, where total transmit power required to transmit the uplink data on the N second-type carriers and transmit the sidelink data on the Y first-type carriers is less than the maximum transmit power of the terminal device, and Y is less than or equal to M.

It should be understood that, the same as M, Y is also a positive integer.

Specifically, if a PPPP of sidelink data on U first-type carriers is less than the first limit, and a sum of U and V is M, the terminal device determines to preferentially transmit the sidelink data on the U first-type carriers.

Optionally, the terminal device may determine that the U first-type carriers have a first priority, the N second-type carriers have a second priority, and the V first-type carriers have a third priority, where the first priority is greater than the second priority, and both the first priority and the second priority are greater than the third priority.

Optionally, when the terminal device determines to preferentially transmit the sidelink data on the U first-type carriers, the terminal device discards transmission of the uplink data on the N second-type carriers and transmission of the sidelink data on the V first-type carriers. It should be understood that, the same as M, U and V are also positive integers.

Optionally, after the sidelink data on the U first-type carriers is transmitted, the terminal device transmits uplink data on K second-type carriers, where total transmit power used to transmit the sidelink data on the U first-type carriers and transmit the uplink data on the K second-type carriers is less than or equal to the maximum transmit power of the terminal device, and K is less than or equal to N. It should be understood that, the same as N, K is also a positive integer.

Optionally, after the sidelink data on the U first-type carriers is transmitted, the terminal device transmits uplink data on Q second-type carriers and transmits sidelink data on S first-type carriers, where total transmit power used to transmit the sidelink data on the U first-type carriers, transmit the uplink data on the Q second-type carriers and transmit the sidelink data on the S first-type carriers is less than or equal to the maximum transmit power of the terminal device, Q is less than or equal to N, and S is less than or equal to V. It should be understood that, the same as N, Q is also a positive integer; and the same as M, S is also a positive integer.

Optionally, when the terminal device determines to preferentially transmit the sidelink data on the U first-type carriers, the terminal device may determine to preferentially transmit sidelink data whose reliability requirement is greater than or equal to the first threshold on the U first-type carriers.

Optionally, when the terminal device determines to preferentially transmit the sidelink data on the U first-type carriers, the terminal device may determine to discard transmission of sidelink data whose reliability requirement is less than or equal to the first threshold on the U first-type carriers.

Optionally, if the sidelink data includes first sidelink data and second sidelink data based on PDCP replication transmission, and the second sidelink data is replicated data of the first sidelink data, the terminal device may determine to preferentially transmit the first sidelink data on the U first-type carriers. Therefore, one piece of sidelink data transmission may be preferentially ensured during the PDCP replication transmission of the sidelink data, so that power consumption can be reduced while replication data transmission is ensured.

Optionally, when the terminal device can determine to preferentially transmit the first sidelink data on the U first-type carriers, the method further includes determining, by the terminal device, to discard transmission of the second sidelink data on the U first-type carriers.

It should be noted that the first sidelink data and the second sidelink data are PDCP PDUs. The terminal device generates a corresponding RLC PDU and further a MAC PDU based on the PDCP PDU. Moreover, the first sidelink data and the second sidelink data on two logical channels of the PDCP replication transmission are determined by the terminal device, or configured by the network device.

Therefore, in the conflict resolving method in this embodiment of this application, when the terminal device needs to transmit the sidelink data on the M first-type carriers and transmit the uplink data on the N second-type carriers, the terminal device may determine, based on the PPPP of the sidelink data transmitted on the M first-type carriers and the first limit, to preferentially transmit the sidelink data on some or all of the M first-type carriers, or to preferentially transmit the uplink data on some or all of the N second-type carriers, thereby resolving a conflict in time dimension between uplink transmission and sidelink transmission of the terminal device.

Figure 4:
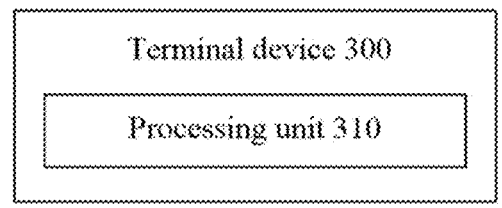
FIG. 4 is a schematic block diagram of a terminal device according to an embodiment of this application.

FIG. 4 is a schematic block diagram of a terminal device 300 according to an embodiment of this application. As shown in FIG. 4, the terminal device 300 is applied to terminal-to-terminal communication. The terminal device 300 needs to transmit sidelink data on M first-type carriers and transmit uplink data on N second-type carriers, and M and N are positive integers. The terminal device 300 includes: a processing unit 310, configured to determine, based on a PPPP of the sidelink data transmitted on the M first-type carriers and a first limit, to preferentially transmit the sidelink data on some or all of the M first-type carriers, or to preferentially transmit the uplink data on some or all of the N second-type carriers.

Optionally, if at least one PPPP of the sidelink data on the M first-type carriers is less than the first limit, the processing unit 310 is specifically configured to determine to preferentially transmit the sidelink data on the M first-type carriers.

Optionally, the processing unit 310 is further configured to discard transmission of the uplink data on the second-type carrier.

Optionally, after the sidelink data on the M first-type carriers is transmitted, the terminal device 300 further includes a communication unit 320, configured to transmit uplink data on X second-type carriers, where total transmit power used to transmit the sidelink data on the M first-type carriers and transmit the uplink data on the X second-type carriers is less than or equal to a maximum transmit power of the terminal device, and X is less than or equal to N.

Optionally, the processing unit 310 is specifically configured to determine to preferentially transmit sidelink data whose reliability requirement is greater than or equal to a first threshold on the M first-type carriers.

Optionally, the processing unit 310 is further configured to determine to discard transmission of sidelink data whose reliability requirement is less than or equal to the first threshold on the M first-type carriers.

Optionally, if the sidelink data includes first sidelink data and second sidelink data based on PDCP replication transmission, and the second sidelink data is replicated data of the first sidelink data, the processing unit 310 is specifically configured to determine to preferentially transmit the first sidelink data on the M first-type carriers.

Optionally, the processing unit 310 is further configured to determine to discard transmission of the second sidelink data on the M first-type carriers.

Optionally, if at least one PPPP of the sidelink data on the M first-type carriers is greater than or equal to the first limit, the processing unit 310 is specifically configured to determine to preferentially transmit the uplink data on the N second-type carriers.

Optionally, if none of PPPPs of the sidelink data on the M first-type carriers is less than the first limit, the processing unit 310 is specifically configured to determine to preferentially transmit the uplink data on the N second-type carriers.

Optionally, the processing unit 310 is further configured to discard transmission of the sidelink data on the first-type carrier.

Optionally, after the uplink data on the N second-type carriers is transmitted, the terminal device 300 further includes a communication unit 320, configured to transmit sidelink data on Y first-type carriers, where total transmit power required to transmit the uplink data on the N second-type carriers and transmit the sidelink data on the Y first-type carriers is less than the maximum transmit power of the terminal device, and Y is less than or equal to M.

Optionally, if a PPPP of sidelink data on U first-type carriers is less than the first limit, and a sum of U and V is M, the processing unit 310 is specifically configured to determine to preferentially transmit the sidelink data on the U first-type carriers.

Optionally, the processing unit 310 is further configured to discard transmission of the uplink data on the N second-type carriers and transmission of the sidelink data on V first-type carriers.

Optionally, after the sidelink data on the U first-type carriers is transmitted, the terminal device 300 further includes a communication unit 320, configured to transmit uplink data on K second-type carriers, where total transmit power used to transmit the sidelink data on the U first-type carriers and transmit the uplink data on the K second-type carriers is less than or equal to the maximum transmit power of the terminal device, and K is less than or equal to N.

Optionally, after the sidelink data on the U first-type carriers is transmitted, the terminal device 300 further includes a communication unit 320, configured to transmit uplink data on Q second-type carriers, and transmit sidelink data on S first-type carriers, where total transmit power used to transmit the sidelink data on the U first-type carriers, transmit the uplink data on the Q second-type carriers and transmit the sidelink data on the S first-type carriers is less than or equal to the maximum transmit power of the terminal device, Q is less than or equal to N, and S is less than or equal to V.

Optionally, the processing unit 310 is specifically configured to determine to preferentially transmit sidelink data having a reliability requirement that is greater than or equal to the first threshold on the U first-type carriers.

Optionally, the processing unit 310 is further configured to determine to discard transmission of sidelink data having a reliability requirement that is less than or equal to the first threshold on the U first-type carriers.

Optionally, if the sidelink data that needs to be transmitted is first sidelink data and second sidelink data based on PDCP replication transmission, and the second sidelink data is replicated data of the first sidelink data, the processing unit 310 is specifically configured to determine to preferentially transmit the first sidelink data on the U first-type carriers.

Optionally, the processing unit 310 is further configured to determine to discard transmission of the second sidelink data on the U first-type carriers.

It should be understood that the terminal device 300 may correspond to the terminal device in the method embodiment and can implement corresponding operations implemented by the terminal device in the method embodiment. For brevity, details are not described herein again.

Figure 5:
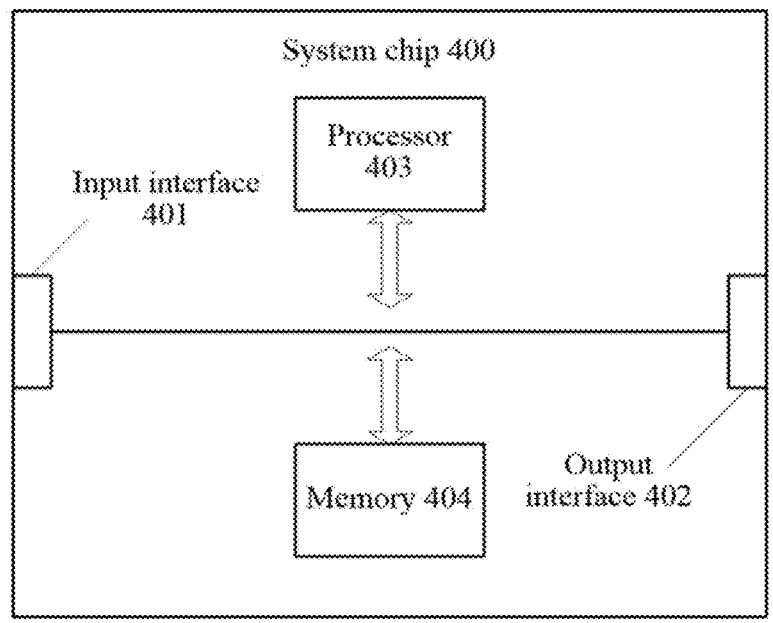
FIG. 5 is a schematic structural diagram of a system chip according to an embodiment of this application.

FIG. 5 is a schematic structural diagram of a system chip 400 according to an embodiment of this application. The system chip 400 in FIG. 5 includes an input interface 401, an output interface 402, a processor 403, and a memory 404 that can be connected by using an internal communication connection line. The processor 403 is configured to execute code in the memory 404.

Optionally, when the code is executed, the processor 403 implements the method performed by the terminal device in the embodiment method. For brevity, details are not described herein again.

Figure 6:
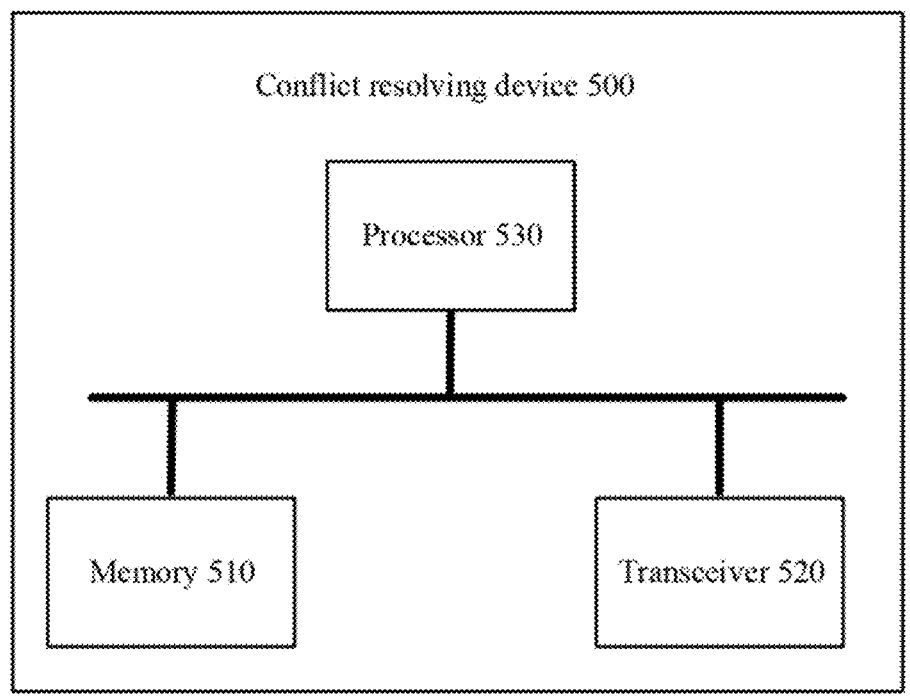
FIG. 6 is a schematic block diagram of a conflict resolving device according to an embodiment of this application.

FIG. 6 is a schematic block diagram of a conflict resolving device 500 according to an embodiment of this application. As shown in FIG. 6, the device 500 includes a processor 510 and a memory 520. The memory 520 can store program code, and the processor 510 can execute the program code stored in the memory 520.

Optionally, as shown in FIG. 6, the device 500 may include a transceiver 530, and the processor 510 can control the transceiver 530 to communicate with the outside.

Optionally, the processor 510 can invoke the program code stored in the memory 520, to perform the corresponding operations of the terminal device in the method embodiment. For brevity, details are not described herein again.

It should be understood that, the processor in this embodiment of this application may be an integrated circuit chip that has a signal processing capability. In an implementation process, steps in the foregoing method embodiment may be implemented by using a hardware integrated logic circuit in the processor, or by using instructions in a form of software. The processor may be a general purpose processor, a digital signal processor (DSP), an application-specific integrated circuit (ASIC), a field programmable gate array (FPGA), or another programmable logic device, a discrete gate or transistor logic device, and a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. The software module may be located in a mature storage medium in the art, such as a random access memory (RAM), a flash memory, a read-only memory (ROM), a programmable ROM (PROM), electrically erasable programmable memory, or a register. The storage medium is located in the memory, and the processor reads information in the memory and completes the steps in the foregoing method in combination with hardware of the processor.

It may be understood that, the memory in this embodiment of this application may be a volatile memory or a non-volatile memory, or may include both a volatile memory and a non-volatile memory. The non-volatile memory may be a ROM, a PROM, an erasable PROM (EPROM), an electrically EPROM (EEPROM), or a flash memory. The volatile memory may be a RAM and is used as an external cache. By way of example, and not limitation, RAMs in many forms such as a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DR RAM) may be used. It should be noted that, the memory in the system and method described in this specification intends to include, but is not limited to, these memories and any other memory of a suitable type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. For brevity, details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the scope of this application. Any variation or replacement readily devised by a person having ordinary skill in the art within the technical scope disclosed in this application shall fall within the protection scope of this application. Therefore, the protection scope of this application shall be subject to the protection scope of the claims.

What is claimed is:

1. A conflict resolution method, applied to terminal-to-terminal communication where a terminal device needs to transmit sidelink data on M first-type carriers, said first-type carrier being a PC5 carrier, and transmit uplink data on N second-type carriers, said second-type carrier being a Uu carrier, and M and N are positive integers, the method comprising:
determining, by a terminal device based on a Proximity Service (ProSe) per-packet priority (PPPP) of sidelink data transmitted on the M first-type carriers and a first limit, to prioritize transmission of sidelink data on some or all of the M first-type carriers,
wherein if a PPPP of sidelink data on U first-type carriers is less than the first limit, and U is less than or equal to M, the determining to prioritize transmission of sidelink data on some or all of the M first-type carriers comprises:
determining, by the terminal device, to prioritize transmission of the sidelink data on the U first-type carriers among the M first-type carriers; and
wherein total transmit power used by the terminal device to transmit the sidelink data on the U first-type carriers among the M first-type carriers and to transmit uplink data on K second-type carriers is less than or equal to a maximum transmit power of the terminal device, and K is a positive integer less than or equal to N.

2. The method of claim 1, wherein, after the sidelink data on the U first-type carriers is transmitted, the method further comprises:
transmitting, by the terminal device, uplink data on Q second-type carriers, and transmitting sidelink data on S first-type carriers, wherein total transmit power used to transmit the sidelink data on the U first-type carriers, transmit the uplink data on the Q second-type carriers and transmit the sidelink data on the S first-type carriers is less than or equal to a maximum transmit power of the terminal device, Q is a positive integer, and S is a positive integer.

3. The method of claim 1 wherein if the sidelink data comprises first sidelink data and second sidelink data based on Packet Data Convergence Protocol (PDCP) replication transmission, and the second sidelink data is replicated data of the first sidelink data, determining to prioritize transmission of the sidelink data on the U first-type carriers comprises determining, by the terminal device, to prioritize transmission of the first sidelink data on the U first-type carriers.

4. The method of claim 3 further comprising determining, by the terminal device, to discard transmission of the second sidelink data on the U first-type carriers.

5. The method of claim 1 wherein if at least one PPPP of the sidelink data on the M first-type carriers is less than the first limit, determining to preferentially transmit sidelink data on some or all of the M first-type carriers comprises determining, by the terminal device, to preferentially transmit the sidelink data on the M first-type carriers.

6. The method of claim 5 further comprising discarding, by the terminal device, transmission of uplink data on a second-type carrier.

7. The method of claim 5 wherein determining, by the terminal device, to preferentially transmit the sidelink data on the M first-type carriers comprises determining, by the terminal device, to preferentially transmit sidelink data whose reliability requirement is greater than or equal to a first threshold on the M first-type carriers.

8. A terminal device, applied to terminal-to-terminal communication where a terminal device needs to transmit sidelink data on M first-type carriers, said first-type carrier being a PC5 carrier, and transmit uplink data on N second-type carriers, said second-type carrier being a Uu carrier, and M and N are positive integers, the terminal device comprising:
a processor;
a memory for storing instructions executable by the processor;
wherein when the instructions are executed, the terminal device is caused to:
determine, based on a Proximity Service (ProSe) per-packet priority (PPPP) of sidelink data transmitted on the M first-type carriers and a first limit, to prioritize transmission of the sidelink data on some or all of the M first-type carriers, wherein M is a positive integer;
wherein if a PPPP of sidelink data on U first-type carriers is less than the first limit, and U is less than or equal to M, determine to prioritize transmission of the sidelink data on the U first-type carriers among the M first-type carriers;
wherein total transmit power used by the terminal device to transmit the sidelink data on the U first-type carriers among the M first-type carriers and transmit uplink data on K second-type carriers is less than or equal to a maximum transmit power of the terminal device, and K is a positive integer less than or equal to N.

9. The terminal device of claim 8 wherein when the instructions are executed, the terminal device is further caused to: if at least one PPPP of the sidelink data on the M first-type carriers is less than the first limit, determine to prioritize transmission of the sidelink data on the M first-type carriers.

10. The terminal device of claim 9 wherein when the instructions are executed, the terminal device is further caused to: discard transmission of uplink data on a second-type carrier.

11. The terminal device of claim 8 wherein when the instructions are executed, the terminal device is further caused to: determine to prioritize transmission of sidelink data whose reliability requirement is greater than or equal to a first threshold on the M first-type carriers.

12. The terminal device of claim 11 wherein when the instructions are executed, the terminal device is further caused to: determine to discard transmission of sidelink data whose reliability requirement is less than or equal to the first threshold on the M first-type carriers.

13. The terminal device of claim 11 wherein when the instructions are executed, the terminal device is further caused to:
 if the sidelink data comprises first sidelink data and second sidelink data based on packet data convergence protocol (PDCP) replication transmission, and the second sidelink data is replicated data of the first sidelink data, determine to prioritize transmission of the first sidelink data on the M first-type carriers.

14. The terminal device of claim 13 when the instructions are executed, the terminal device is further caused to: determine to discard transmission of the second sidelink data on the M first-type carriers.

* * * * *